United States Patent [19]
Gregorio et al.

[11] Patent Number: 6,020,967
[45] Date of Patent: Feb. 1, 2000

[54] DIFFERENTIAL DISPLACEMENT OPTICAL SENSOR

[76] Inventors: Pedro Gregorio, 7353 Dunver Crescent, Verdun, Quebec, Canada, H4H 2H6; Vincent Hayward, 2277 Harvard, Montreal, Quebec, Canada, H4A 2W1; Danny Grant, 6829A rue St. Denis, Montreal, Quebec, Canada, H2S 2S3

[21] Appl. No.: 09/282,153

[22] Filed: Mar. 31, 1999

[51] Int. Cl.$^7$ .................................................. G01B 11/00
[52] U.S. Cl. ............................................. 356/375; 356/373
[58] Field of Search .................................. 356/375, 373, 356/356, 354; 250/237 G, 559.29; 360/75, 77.03, 78.06, 78.11

[56] References Cited

U.S. PATENT DOCUMENTS

| | | | |
|---|---|---|---|
| 5,153,472 | 10/1992 | Karidis et al. | 310/13 |
| 5,473,156 | 12/1995 | Pinnock et al. | 356/375 |
| 5,666,236 | 9/1997 | Bracken et al. | 360/75 |
| 5,691,814 | 11/1997 | Strasser | 356/375 |
| 5,847,528 | 12/1998 | Hui et al. | 318/568.1 |

*Primary Examiner*—Hoa Q. Pham

[57] ABSTRACT

Positional sensors receive light that has been reflected off a pair of complementary geometric patterns carried by a supporting, displaceable carrier surface. The sensors view the patterns through viewing windows as the carrier surface is displaced laterally, presenting differing portions of the patterns to the sensors. The patterns are shaped to produce outputs which, when their difference value is extracted, provide output signals that are a measure of the displacement of the carrier surface and in which common mode errors are minimized.

11 Claims, 15 Drawing Sheets

Fig 7B: Quadratic Swatch Single Side

Fig 7C: 4th Order Polynomial Swatch Single Side

Fig 8: Maximum Sensitivity Linear swatch

Fig 9: Graded Swatch Pattern

Fig 10: Linear Radial Swatch

Fig 11: Maximum Sensitivity Linear Radial Swatch

Fig 12A: Single Side Linear Radial Swatch

Fig 12B: Single Side Linear Radial Swatch

DIFFERENTIAL DISPLACEMENT OPTICAL SENSOR

FIELD OF THE INVENTION

This invention relates to sensors for detecting mechanical displacements. It is suited for use in machinery of any type but, due to its high accuracy, is especially suited to robotic applications and haptic controllers

BACKGROUND TO THE INVENTION

It is known to provide a viewing surface that is optically graded to vary in its transmissive or reflective capacity along a longitudinal or circumferential path as part of a position sensor. Sensors passing along such path are exposed to varying illumination, corresponding to the location of such sensors along the path.

A paper authored by V. D. Brown and W. S. Newman and published by AT&T in the AT&T Technical Digest No. 78 of Jul. 1986 (page 5) shows a "V" shaped light transmitting pattern formed in a mask that is wrapped circumferentially around the outer surface of a transparent cylinder source containing a light source in its core. Rotation of the "V" shaped pattern past a light sensor provides a sensor output that corresponds to the rotational displacement of the cylinder.

This same publication depicts a tapering lighttransmitting region formed in a mask carried on the face of a transparent rotatable disc or wheel. Light transmitted through the disc to a sensor provides a sensor output which is proportional to the rotational displacement of the wheel.

In U.S. Pat. No. 5,666,236 of Bracken et al issued to Iomega Corporation for a computer disc drive the position of a read-head arm is determined by sensing a "gray-scale" pattern, which includes an array of parallel gradually thinning lines, based on the intensity of light reflected from the pattern as it passes before a sensor.

Both of these prior art references rely upon obtaining a light signal from a single optical source using a single light modulating pattern and a single light sensor.

Another reference, U.S. Pat. No. 5,153,472 to Karidis et al depicts an actuator for positioning a probe which includes as a position sensing device two oppositely oriented, parallel, tapered windows (FIGS. 6, 6A; ref. 76, 77) mounted in a single plate. Light, optionally from a common source shone through these triangular windows is intercepted by two independent light sensors. By reason of the reversed orientation of the two windows, the intensity of light received by the respective sensor varies in a complementary fashion. Without stating how the output signals of the light sensors are processed, this reference observes that this variable light limiting plate can be used to determine its precise position.

While the prior art examples correlate position with the intensity of light modulated by an optical pattern, the full potential of such arrangements has not been recognized or exploited.

Absent from these references is any suggestion that the use of dual complementary images can serve to reduce the noise and errors inherent in sensors of this type. In particular, there is no suggestion as to the advantageous ways in which such dual outputs may be combined to produce measurement of improved fidelity and precision. This invention addresses further improvements in the utilization of this type of effect.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

The invention in one of its broader aspects comprises a pair of complementary optical patterns of graded optical reflection characteristics fixed geometrically with respect to each other on a carrier surface. The patterns are optically complementary to each other in the sense that the optical characteristics of fields of view at two paired sampling "window" regions respectively positioned across each pattern and fixed with respect to each other, provide values for the optical characteristics of the two viewed patterns that, when the difference between such values is taken, can be used to provide a measure of improved accuracy for the displacement of the complementary optical patterns and the carrier surface beneath the two sampled window regions.

More particularly, the invention is based on a position sensor for sensing the position of a displaceable carrier surface with respect to a frame comprising:

(a) dual optical patterns or images that provide diffusely reflected light reflected from a source, the dual optical patterns being positioned on and carried by the carrier surface, (b) displacement means whereby the carrier surface and dual optical patterns are displaceable along a geometric viewing path, (c) dual light sensors for providing output signals carried by said frame and positioned to respectively receive diffuse light from the dual optical patterns from respective fields of view encompassing portions of each of said optical patterns as they are displaced along their respective geometric viewing paths, (d) difference measuring means coupled to said sensors for providing a difference output based on the output signals received from said sensors wherein the dual optical patterns are optically graded and are complementary to each other in their provision of diffuse light to said light sensors from said respective fields of view whereby said difference output corresponds to the position of the carrier surface along the geometric viewing path with respect to the frame. The extraction of the difference value as generated by this arrangement allows common mode noise to be rejected or attenuated.

A major source of noise in any sensor system is that arising from the environment. This includes power source noise and ambient light. All such noise can be either eliminated or reduced by the use of a dual sensor arrangement from which a differential signal is extracted. This type of arrangement addresses what is known as "common-mode" noise, or more precisely "correlated noise" originating from a common source that typically has an equal impact on the separate channels.

Preferably both fields of view receive light from the same, common source of illumination. The invention relies upon diffuse reflected light obtained from the optical pattern by reflection. In the case of diffuse illumination, a surface area emits photons generally from all over its entire surface. The detected light of the invention is accordingly sampled from the entire surface area of the sampled fields of view of the optical patterns.

By relying upon diffuse light less noise is likely to be present in the sensor's output signal. This is because most sources of specular light emit light that is not of constant intensity over a significant surface area. Thus if a sensor were viewing a specular source of light through an opening in a mask, displacement of the mask would not necessarily cause the sensor output to vary directly and precisely with respect to the degree of displacement. Further, light sensed directly from a specular light source, e.g. an incandescent filament, is more likely to contain photonic noise, e.g. shot noise, than light sensed from a diffuse source.

The invention is based upon the optical patterns, as detected through respective fields of view, having a varying reflective capacity along the direction of their displacement. Such optical patterns may be based on a bright region formed against a black background; or the field may be reversed to provide a dark shaped region formed against a bright background.

The optical patterns suited for use in the invention in linear displacement systems may be in the form of two equal triangles, or portions thereof, aligned to point in opposite directions with their axes of symmetry being parallel to each other. In such case the sensed regions would be based on sensor fields of view spanning the respective triangles, transversely to their axis of symmetry. The use of triangular images contributes to providing an output that varies linearly with displacement. Providing a linearly varying output is not, however, essential when non-linearity may be accommodated by appropriate adjustive signal processing. In fact, linear output can also be provided through use of complementary images that are not triangular: the image widths may vary in accordance with curves created by second and fourth order polynomials.

In another variant, the optical patterns in rotational systems may be in the form of two crescent-shaped shaped wedges disposed about a centre of rotation for a rotating carrier. The bifurcating centre lines of the respective wedge patterns are preferably concentric about the same centre of rotation. The sensed regions are then selected to be within fields of view, conveniently window-defined, that span the respective crescent-shaped patterns. Such fields of view are preferably oriented in a radial direction.

The crescent-shaped patterns may be mirror-image shapes disposed symmetrically about the centre of rotation at equal radial distances. Or they may be of differing shapes and placed with one pattern nested within the other within a sector of the rotatable carrier. In either case the sensed region, as detected by respective sensor means associated with each region, should provide values for their respective optical characteristics that can, when a difference value is extracted, cancel-out or minimize common mode noise.

The optical pattern may be distinct, as in the case of triangular patterns; or it may be diffuse, as in the case of a "grey" state created by a field of micro-dots of varying density. In all cases, the optical characteristic of the sensed region must provide signals that can exploit the difference criteria of the invention.

In the case of the use of distinct, complementary optical patterns, such as triangles or crescent-shaped wedges, the parameter measured within the sensed region is the total value for the light received from the field of view. The field of view in such case should preferably be wide enough to span both opaque and illuminating portions of the sensed region. In the case of triangular patterns, that have a maximum width at one end the sensors should preferably sample sensed regions through a field of view that is as wide as the triangle at one end of the geometric path being sampled.

In order to reduce noise, it is preferable that a sensor in this type of system have as large field of view as practical. This will increase the signal strength. The preferred pattern is one that ranges from full intensity to complete extinguishment over the limits of geometric displacement of the image. Thus, if the range of displacement is equal to the width of the field of view, then a black-white boundary will produce the highest modulation of output. This, in-turn, will tend to increase the signal-to-noise ratio.

By providing an image which is geometric in shape e.g. a triangle, the rate of change of illumination of the sensor with displacement of the image can be decreased over that of a black-white boundary. Further, the span of travel that can be detected for the geometric image can be enlarged indefinitely beyond the width of the viewing window. The maximum displacement that can be measured corresponds to the length of the "tapered" geometric pattern, less the width of the viewing window.

While the sensed regions may be separated from each other by substantial distances, an advantage of placing the sensed regions in close proximity is that a common light emitter may serve to provide identical or near identical conditions of illumination at the respective sensed regions.

Significant advantages of the invention arise when dual complementary images are exposed under common illumination conditions for viewing by dual matched sensors through fields of view that provide similar, corresponding illumination for each sensor from its respective image. When the illumination conditions are identical, this will eliminate or limit the need for a calibration component that may arise when separate sources of illumination are provided at separate locations. Illumination within the fields of view for the two sensors need not be constant across each field. But the benefits of the invention will be obtained if similar conditions of illumination apply to each of the viewed regions. By taking the difference between the respective signals from the two sensors under fully balanced conditions, common mode noise will be eliminated.

Under practical circumstances the sensors may not be perfectly matched and other constraints may be less than ideal. But even in such cases, common mode noise will be reduced. If the departures from idea balance are known, e.g. the ratio of the illuminations of the respective images or mis-matches in the images, then corrective procedures, such as increasing the value of the output from one sensor before extracting the difference value, may be applied to further decrease common mode noise. These procedures can be part of a calibration process. The key objective is to produce a differential value output that varies with the displacement of a pair of viewed images of complementary character past the fields of view of the sensors.

A further means of reducing noise arises from the photodiode circuitry electrical circuit arrangement for the light sensors. Typically these sensors are solid-state, light sensing diodes that are operated in their reverse current range—photodiodes.

A normal arrangement is to apply a reverse voltage to such diodes through a current limiting resistor. As light falls on the light-sensing diode, the reverse current increases. The change in the voltage drop across the current limiting resistor is typically taken as the output signal that corresponds to the degree of illumination.

If instead of sampling the voltage drop across the current limiting resistor, if the voltage drop across the diode is taken as the signal source, then a higher signal-to-noise ratio may be achieved when the diode is operated in its reverse region.

The foregoing summarizes the principal features of the invention and some of its optional aspects. The invention may be further understood by the description of the preferred embodiments, in conjunction with the d wings, which now follow.

DESCRIPTION OF THE PREFERRED EMBODIMENT

Figure 1:
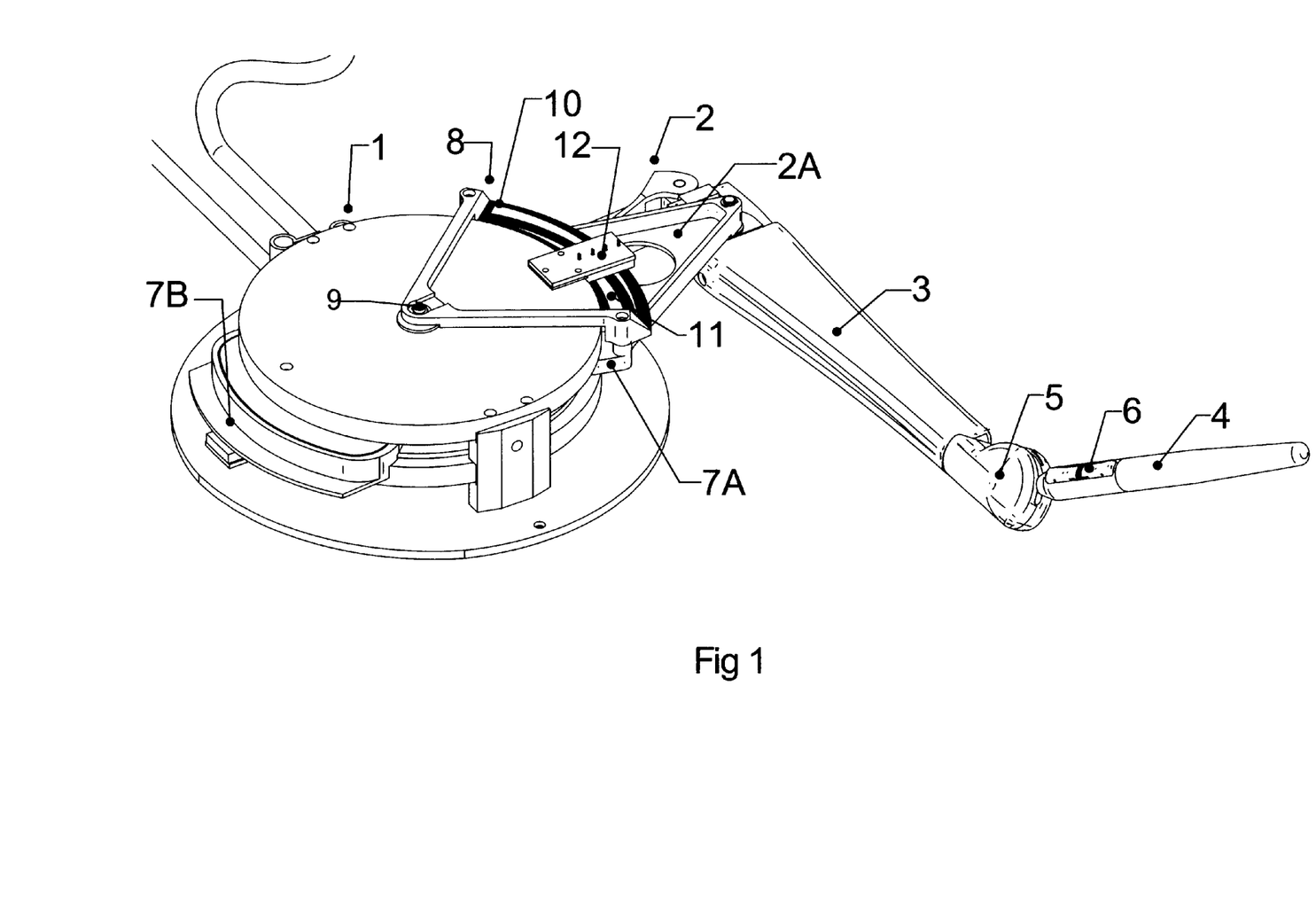
FIG. 1 is a perspective view of a hand controller incorporating a position sensor according to the invention.

FIG. 1 shows a haptic hand controller 1 which, in feedback mode, drives an arm 3 through linkages 2 to displace a handle 4 carried through a gimballed joint 5 which is grasped by a user. These same linkages provide a position sensing system for the centre point of the gimballed joint.

A series of torquers 7A, 7B drive the linkages 2. Shown mounted to one of the linkages 2A is a rotational position sensor 8 carried by a torquer 7A. This sensor 8 has a carrier surface 10 on which is located a geometric pattern 11. This pattern 11 swings in an arc about a central axis 9 with movement of the linkages 2, passing the pattern beneath a light sensing assembly 12.

Figure 2:
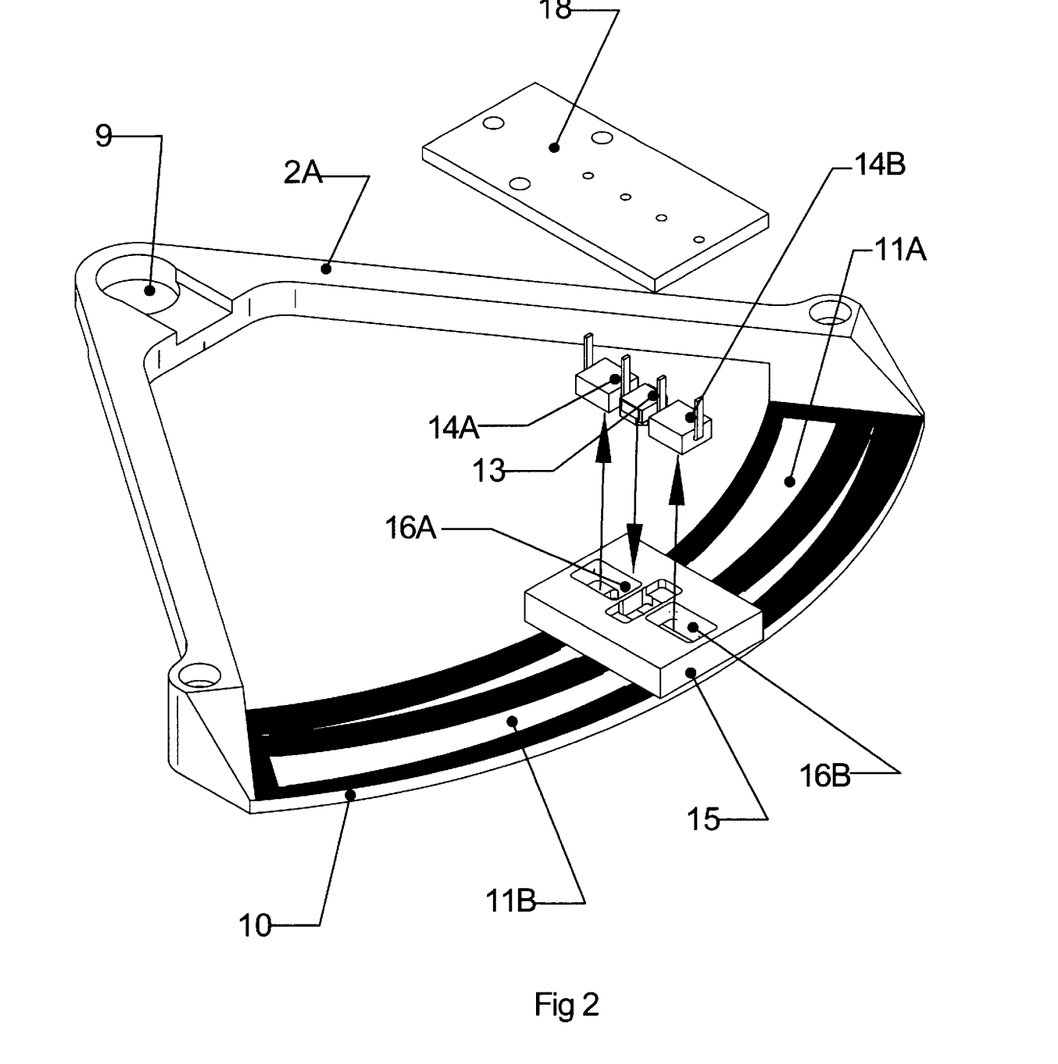
FIG. 2 is an exploded perspective view of the position sensor components of FIG. 1.

The light sensing assembly 12, as shown in exploded view in FIG. 2, has a light source 13 and two light sensors 14A, 14B, preferably based on solid-state photodiodes. The source 13 and sensors 14A, 14B are fitted into a mask 15 having two windows 16A and 16B that provide the sensors 14A, 14B with respective fields of view 17A, 17B of the geometric pattern 11 (shown in FIG. 3).

The light source 13 is positioned to illuminate the geometric pattern 11 in the regions of both of these fields of view 17A, 17B at the same time and to a similar degree. Preferably, the light source 13 is positioned to provide equal illumination conditions within and over each of the respective fields of view 17A, 17B. It is acceptable, if the illumination has a gradient, for this gradient to be similar or symmetrical within each of the fields of view 17A, 17B.

A cover plate 18 seals-off the mask 15 containing the light source 13 and photodiodes 14A, 14B within. Conveniently, the cover plate 18 may also constitute a substrate for printed circuit connections. Electrical leads 19 as shown in FIG. 3 protrude through holes in the plate 18 to connect with wires (not shown) which may be printed on cover 18.

Figure 3:
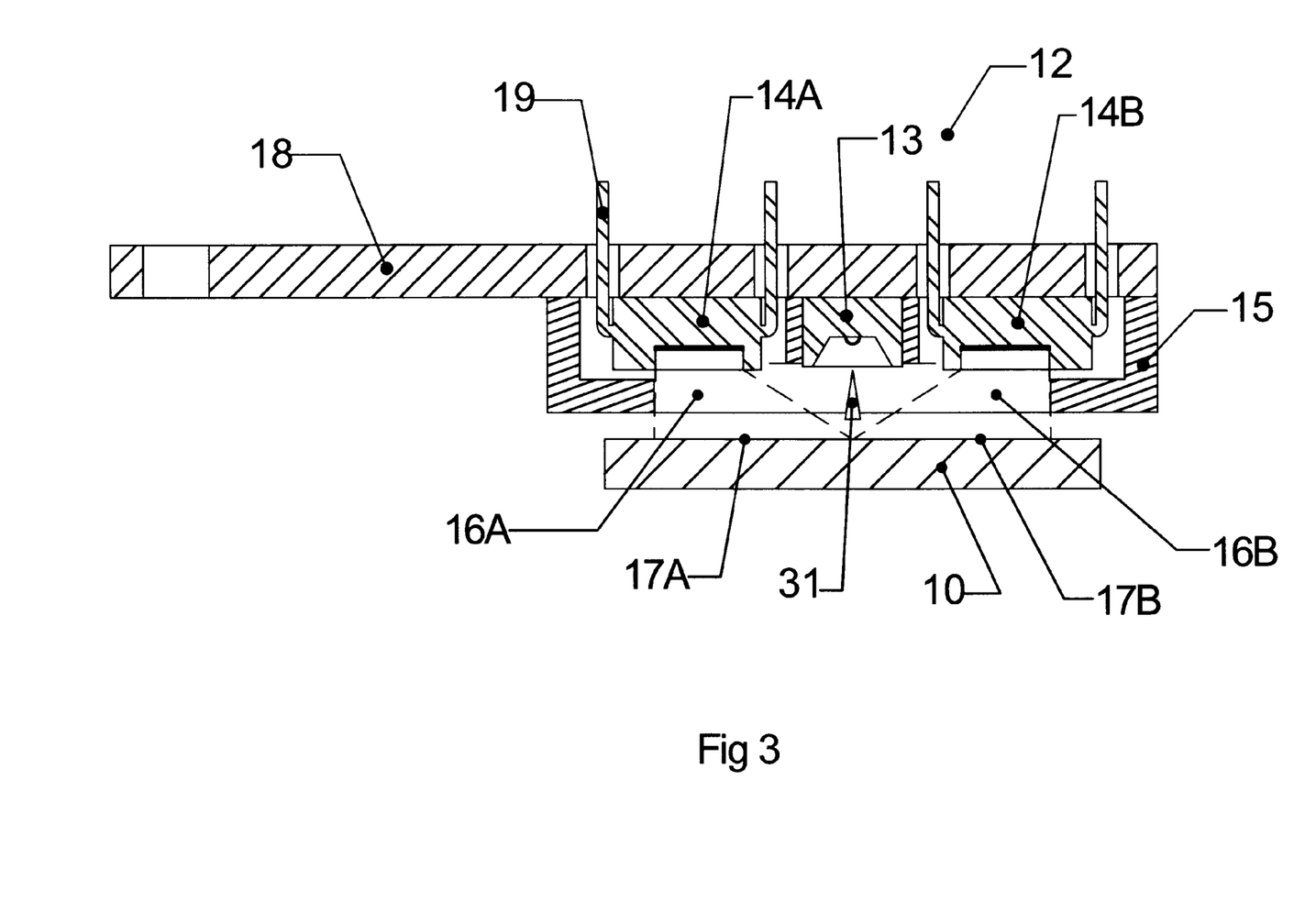
FIG. 3 is a cross-sectional view of the light source and light detector components of the light sensing assembly of FIG. 2.
Figure 4:
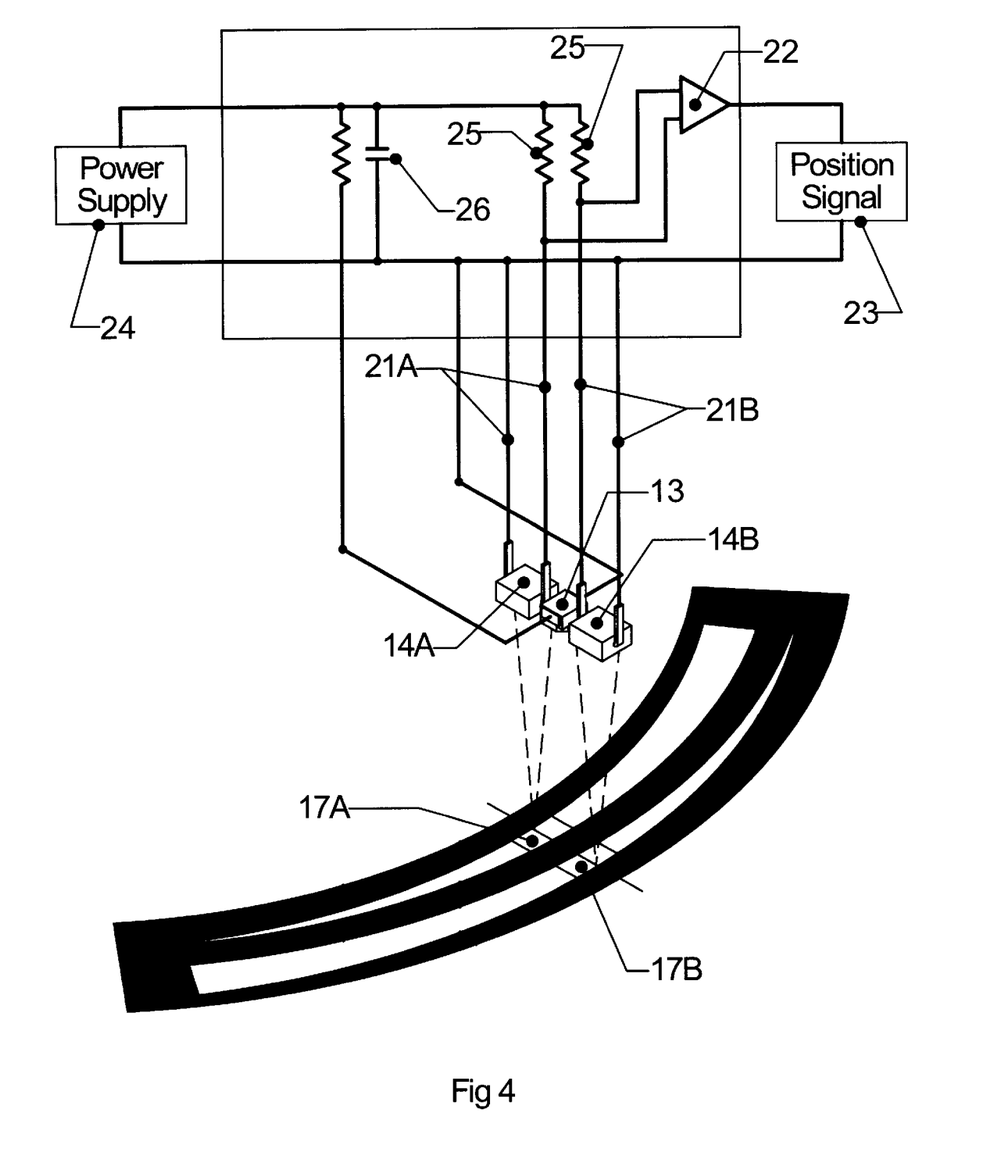
FIG. 4 is a schematic view of the electrical circuit associated with FIG. 3.

The light sensing assembly 12 overlies the optical pattern as shown in FIGS. 2 and 3 with the fields of view 17A, 17B directed to complementary image portions 11A, 11B of the pattern 11 (FIG. 4). The field of illumination of the light source 13 extends over the greater portion of both fields of view 17A, 17B equally. The complementary image portions 11A, 11B are shown in FIG. 4 as bright, preferably white, curved triangular shapes on a dark, preferably black, background. An optional curtain wall 31 may be provided to ensure that the fields of view 17A, 17B are non-overlapping.

The mask 15 of the invention contributes several valuable features to the invention. It helps define the fields of view 17A, 17B more precisely by providing the windows 16A, 16B. It provides a support for positioning the light source 13 in precise relation to the light sensors 14A, 14B to maximize the prospects that the field of illumination provides similar illumination to the fields of view 17A, 17B over the respective image portions 11A, 11B. And it serves to exclude or reduce to a minimum the entry of ambient light into the fields of view 17A, 17B. To achieve this last benefit, the mask is located directly adjacent to the optical image 11 on the carrier 10.

In FIG. 4 the circuitry of the signal processing system is depicted. Signals issue from the sensors 14A, 14B and are lead by wires 21A, 21B to a difference amplifier 22 which provides a position signal 23 as its output. A power supply 24, biasing and limiting resistors 25 and filter capacitors 26 are of standard form.

By extracting the signal for input to the difference amplifier 22 from across the photodiodes 14A, 14B, an improved signal to noise ratio is obtained over that which would arise if the voltage drop across the bias resistors 25 were used as the input to the difference amplifier 22.

Figure 5A:
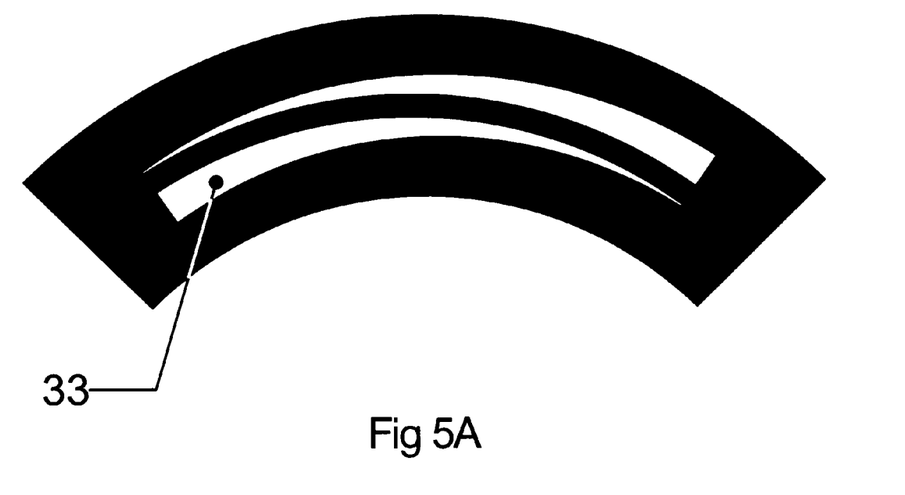
FIGS. 5A, 5B are reversed field views of curved images for use in a rotary sensor.
Figure 5B:
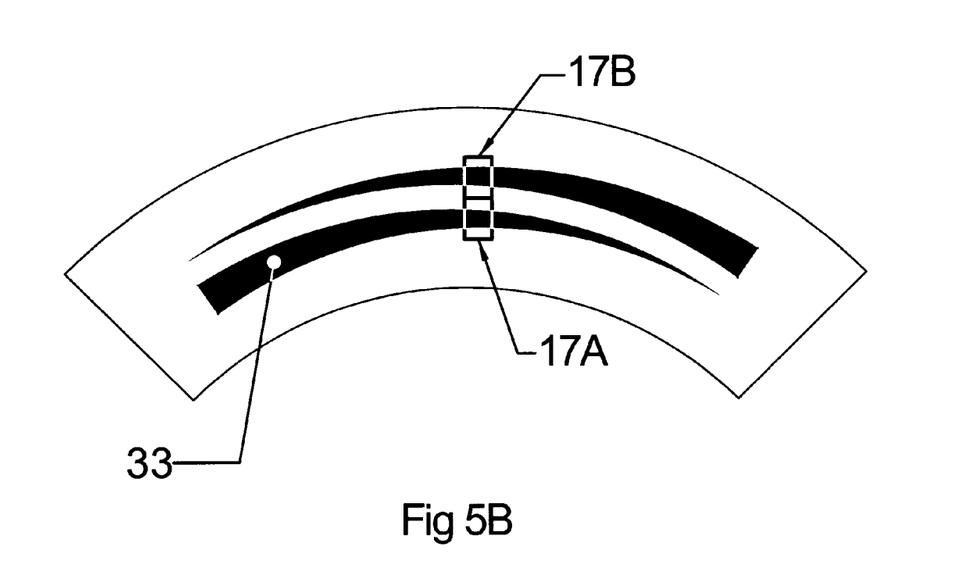
Figure 6A:
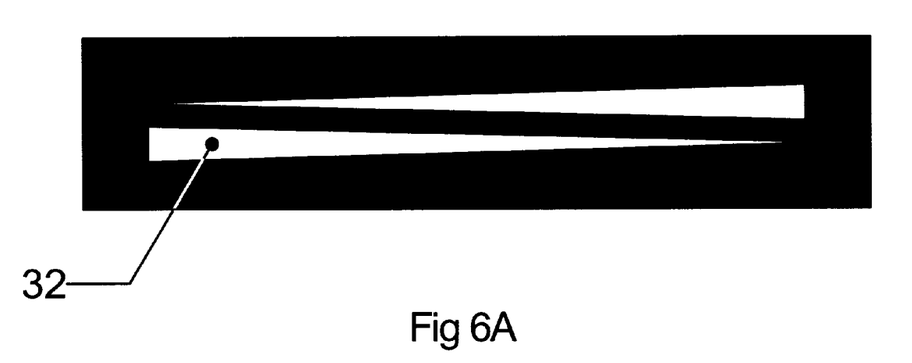
FIGS. 6A, 6B depict paired linear triangles on reversed fields for use in a linear displacement sensor.
Figure 6B:
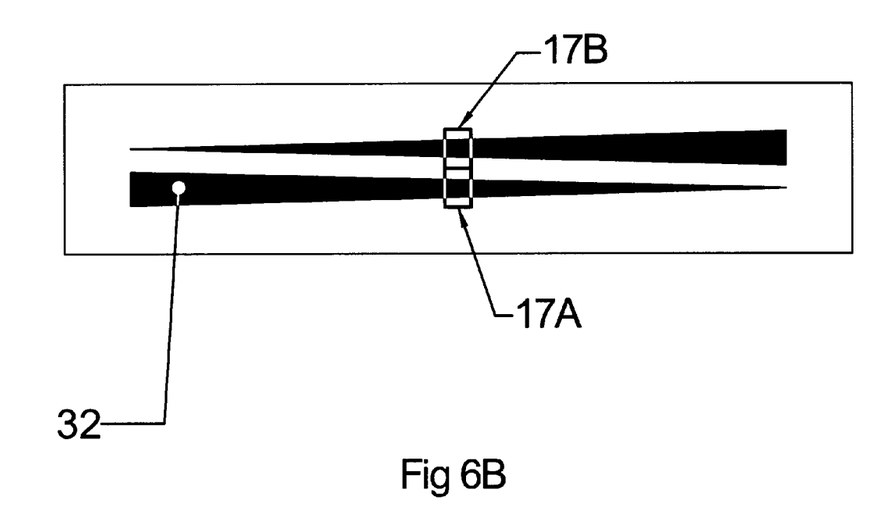

FIG. 5A and 5B show paired, curved, crescent patterns 33 with reversed fields for sensing rotary displacement. FIGS. 6A and 6B show paired straight triangular patterns 32 with reversed fields for sensing linear displacement. While the triangles 32 in each pair of FIGS. 6A, 6B are of identical shape, the crescents 33 of FIGS. 5A, 5B differ so that the illumination values extracted from fields of view 17A, 17B will support the difference criterion of the invention.

While full triangles and figures are shown in FIGS. 6A, 6B and 5A, 5B portion only of such figures may also be employed.

Figure 7A:
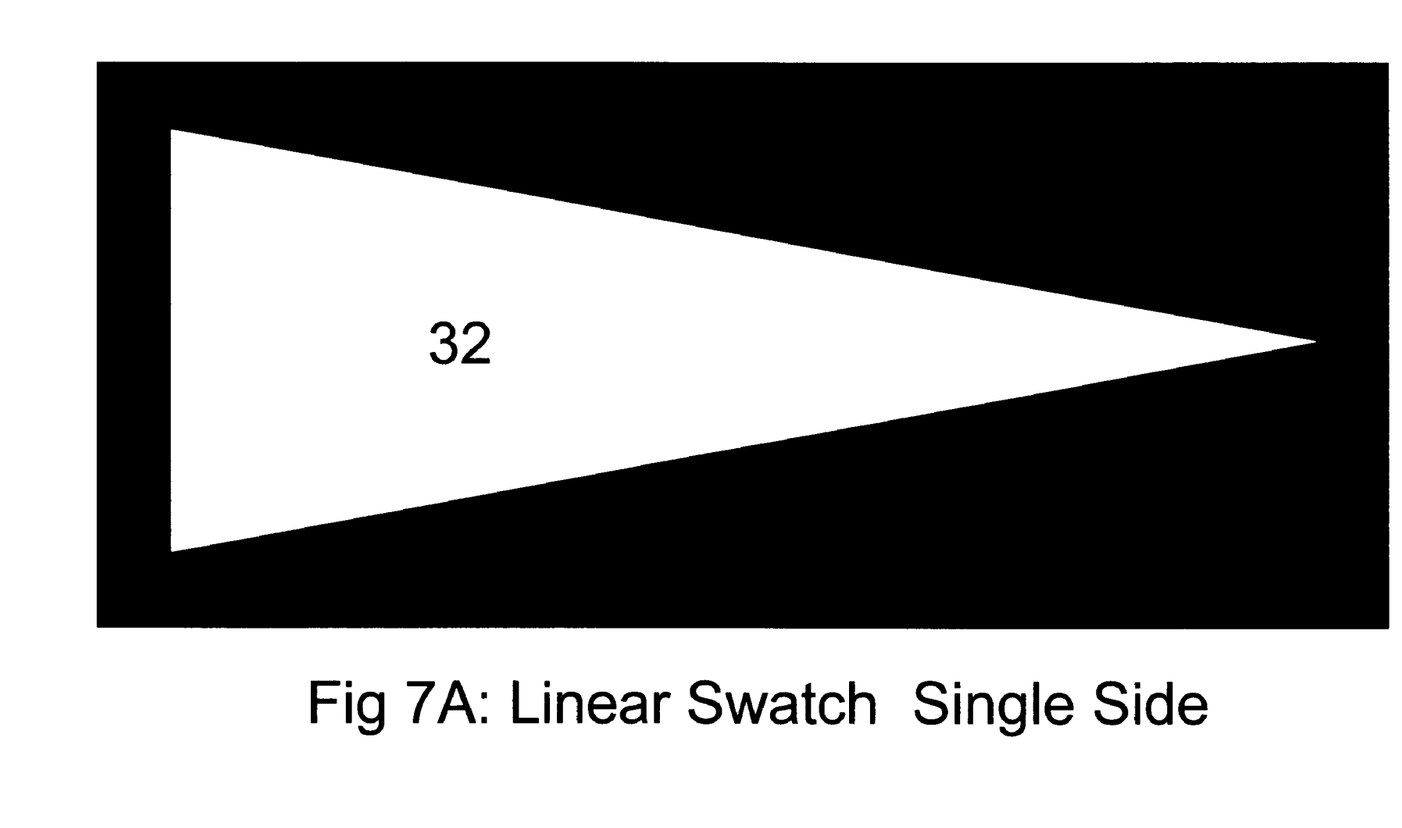
FIGS. 7A, 7B and 7C depict respectively one half of a paired image for a triangular pattern, a quasi-triangle based on parabolic or quadratic curvature, and a non-linear image based upon fourth order curvature.
Figure 7B:
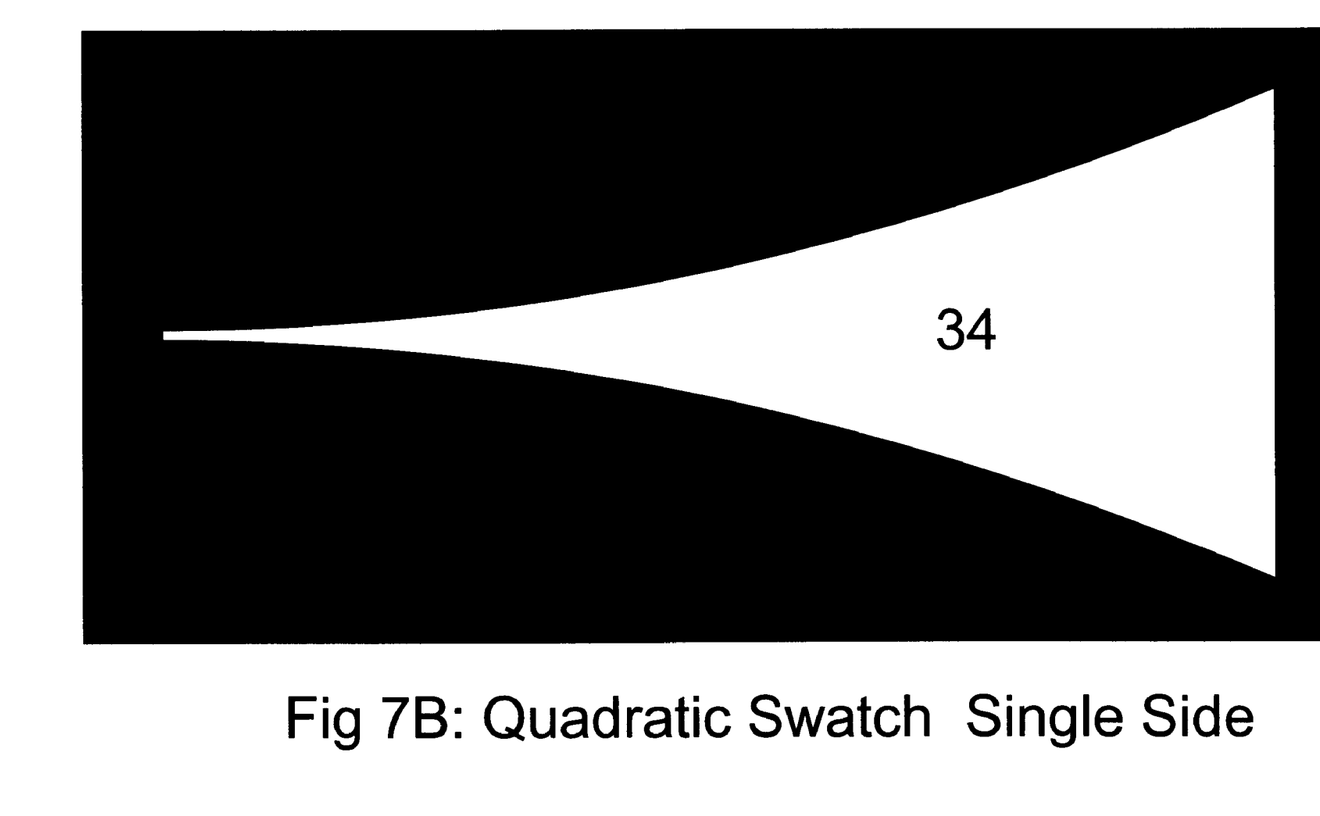
Figure 7C:
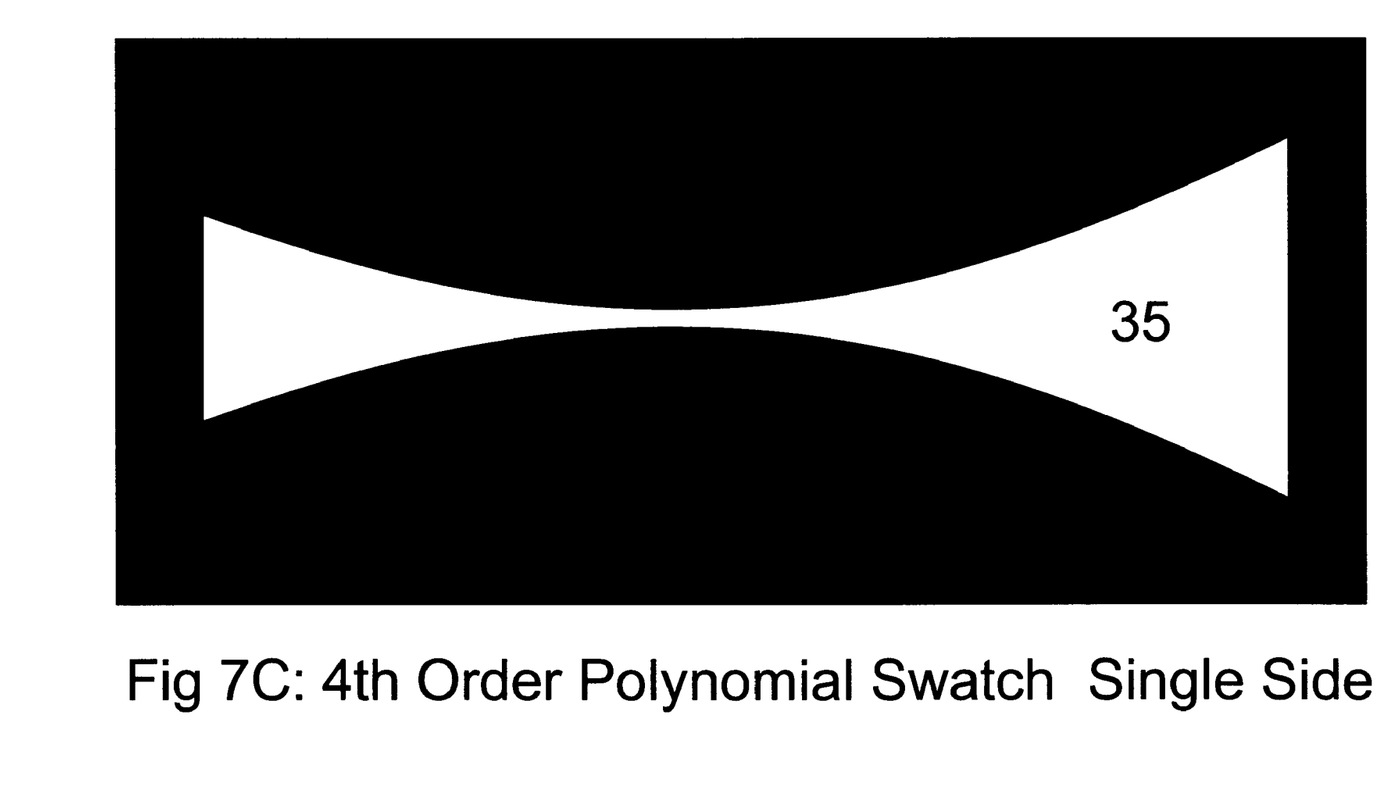

FIGS. 7B and 7C in contrast with a normal triangle of FIG. 7A, are suitable images even though they appear as distorted triangles 34, 35 that are "pinched" inwardly with boundaries defined by quadratic and 4th order polynomial curves. It has been found that complementary geometric figures whose optical brightness varies as either a second order or fourth order polynomial can be combined in a difference amplifier to produce an output that varies linearly with displacement over at least a portion of their range. An advantage of using these geometric forms is that the output signals from the sensors 14A,14B can be maintained more nearly equal over a given range of geometric displacement. Cancellation of correlated noise is more effective in cases where the two signals from which a difference is extracted are more nearly of equal value. This is because some correlated noise is proportional to signal strength.

A disadvantage of using geometric patterns of the type identified in FIGS. 7B, 7C is that the alignment of the respective images 34, 35 with their paired complementary image and with the light sensing assembly 12 becomes more critical. A phase shift between the position of two triangles 32 does not affect the difference output. But such a phase shift becomes relevant for the other geometric patterns.

Figure 8:
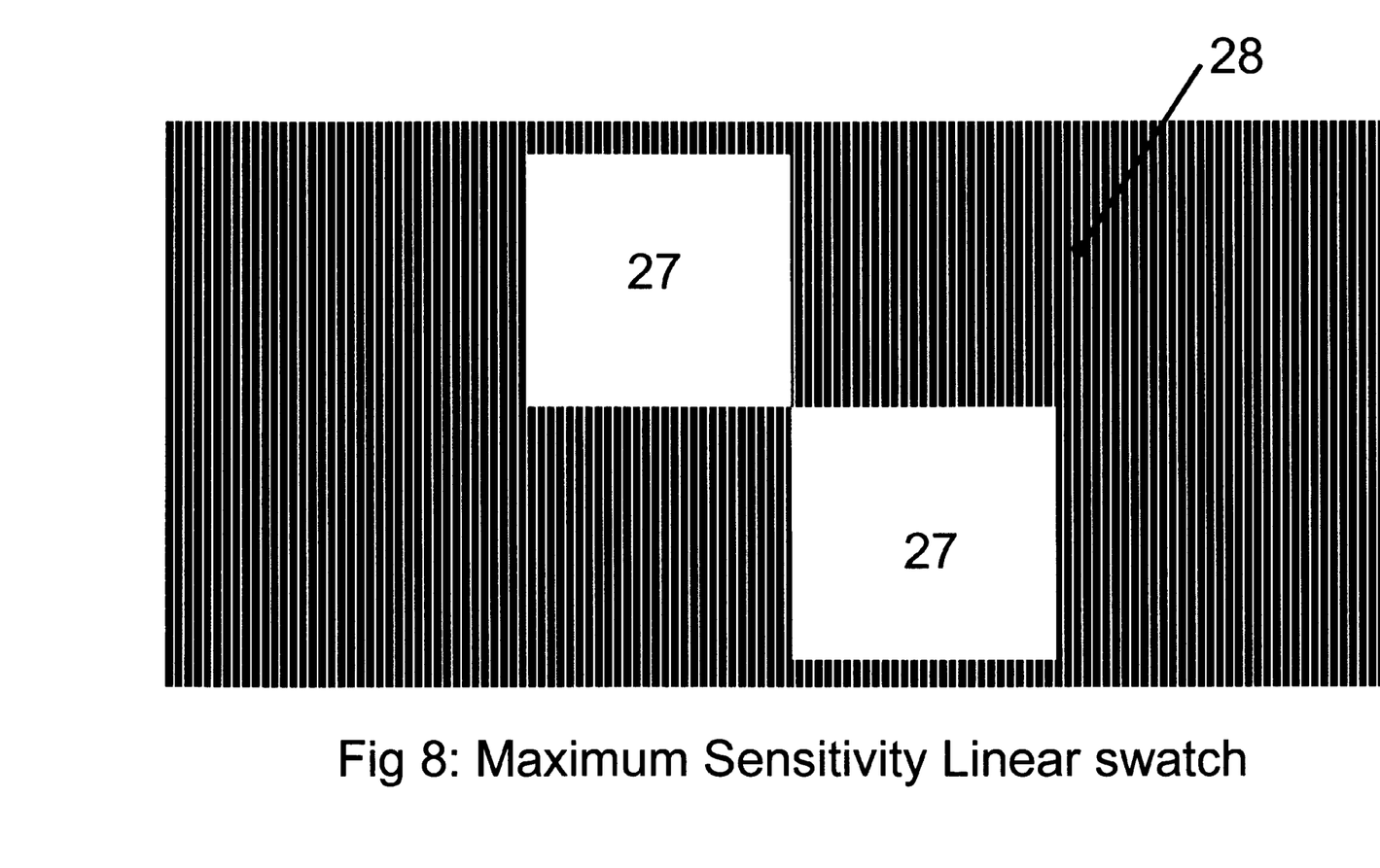
FIG. 8 shows a linear displacement sensor image with an abrupt black-white boundary that provides an improved signal to noise ratio.

FIG. 8 shows two rectangular light-coloured regions 27 on what is intended to be a black background 28. This is a pattern that, when used with fields of view as wide as the images, provides a maximum signal-to-noise ratio but is limited in the span of linear displacement that can be detected. By providing tapered images as in FIGS. 5A, 6A, the span of displacement that can be detected is increased.

Figure 9:
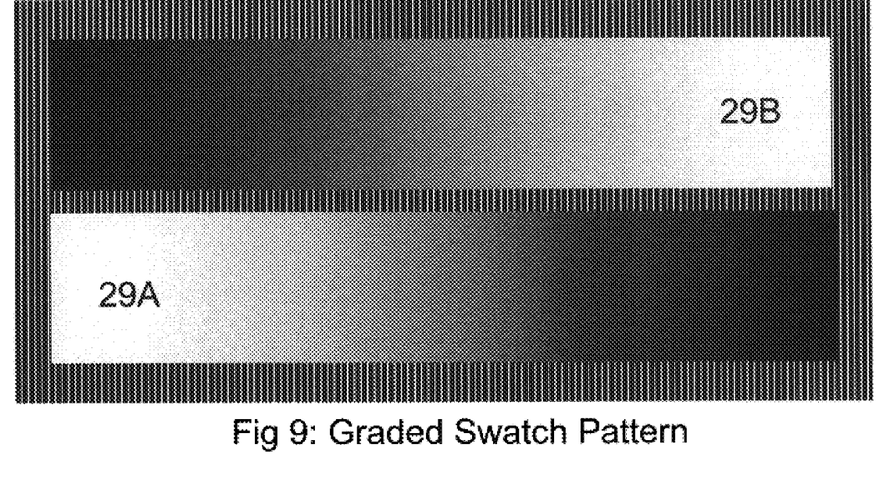
FIG. 9 depicts dual, complementary gray-scale graded images for use in a linear displacement sensor.

The optical pattern being detected need not be a distinct geometric figure. FIG. 9 shows two grey-shaded FIGS. 29A, 29B that transition in a regular progression from brightness to darkness.

Figure 10:
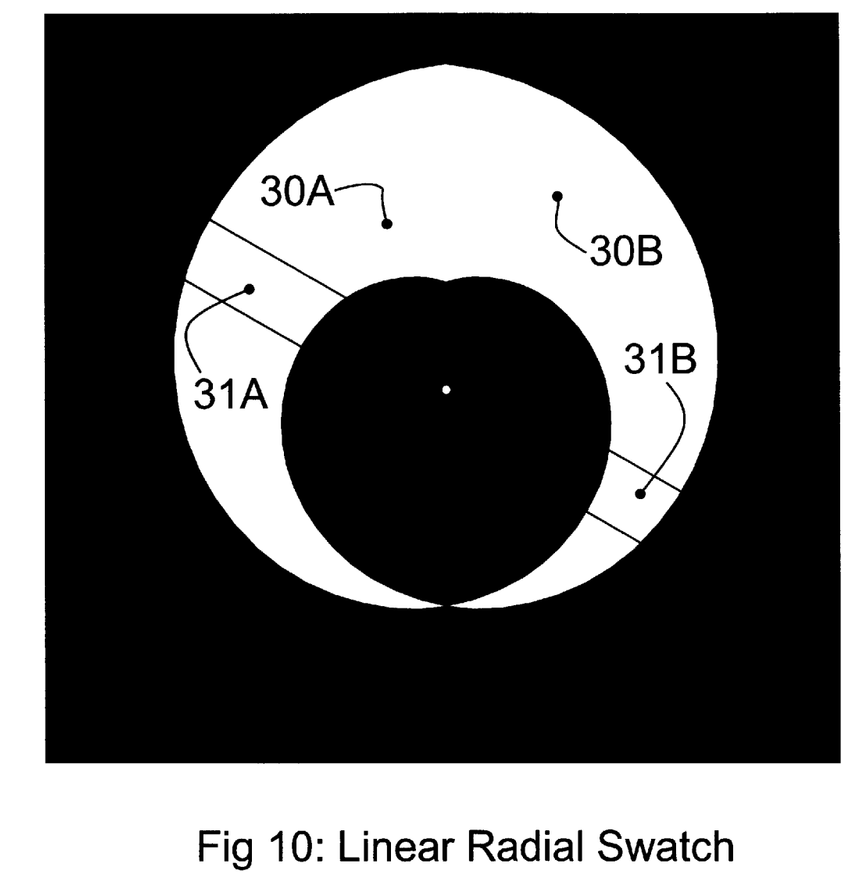
FIG. 10 depicts mirror image circular counter parts to dual triangular images for use in measuring up to nearly 180 degrees of rotary displacement.

The curved patterns 33 of FIGS. 5A 5B are radially nested and are limited to detecting radial displacements over a range of approximately 60 degrees. In FIG. 10 an alternate mirror-image optical image which has image elements 30A, 30B is depicted. This image can be used to measure radial displacements over a range of up to nearly 180 degrees based on relatively narrow fields of view 31A, 31B that extend radially in opposite directions. The carrier 10 for this image would be a plate or disc that is free to rotate through 180 degrees.

Figure 11:
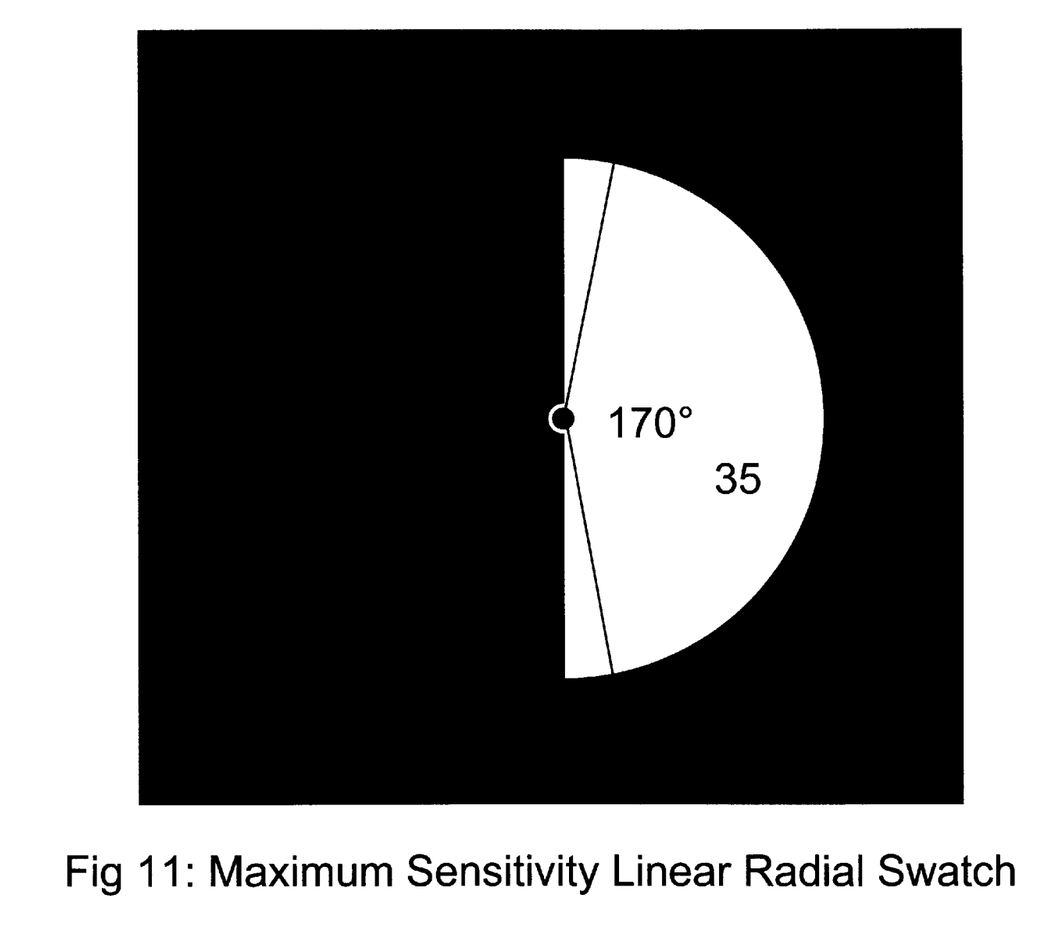
FIG. 11 depicts the rotary counterpart to FIG. 8.

FIG. 11 is the radial equivalent to FIG. 8. Its range is equal to the angular span of the relatively large 170 degree maximum size windows 35 through which the image is viewed. Two windows 35 are employed on opposite sides of the center of rotation. The second window is not visible in FIG. 11 as it lies over the black region. Smaller windows 35 may be employed, at the expense of having the range of motion measurement limited to the span of the windows using this configuration.

Figure 12A:
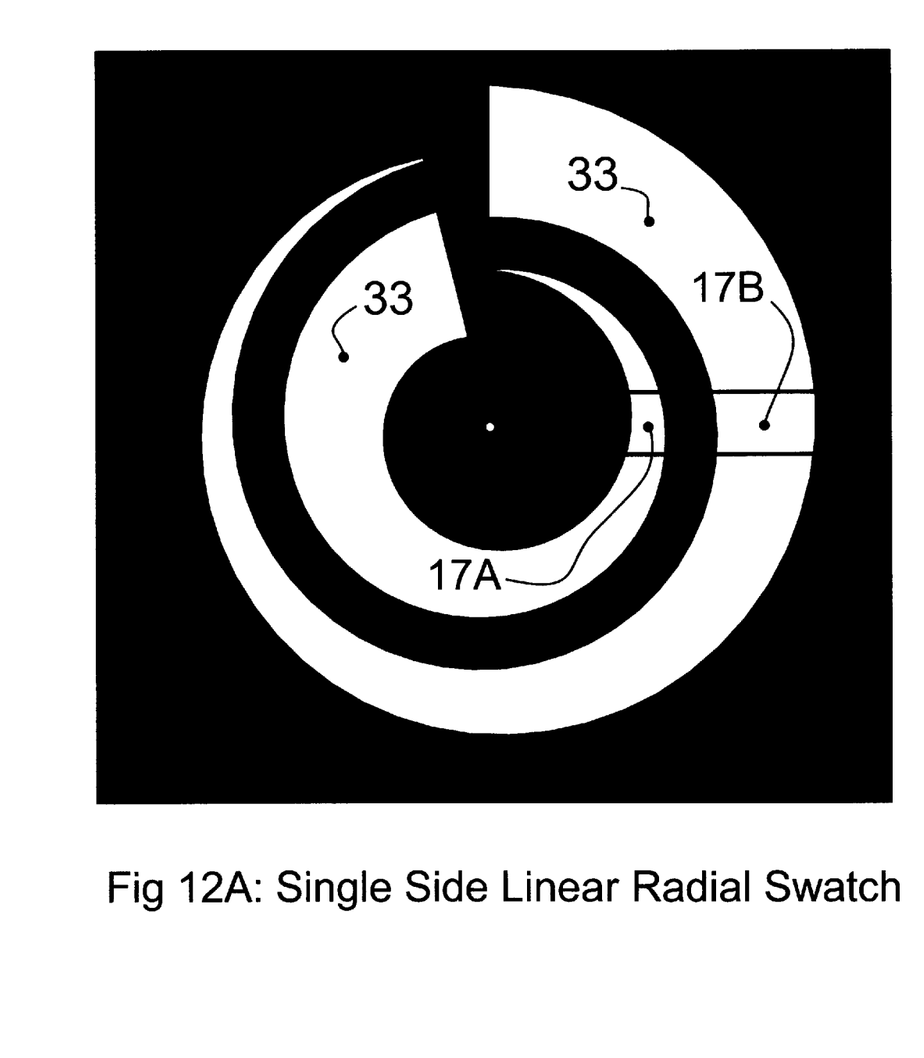
FIGS. 12A and 12B show respective rotary counterparts to FIG. 5A that span about 300 degrees and 180 degrees, with the crescent in FIG. 12B truncated.
Figure 12B:
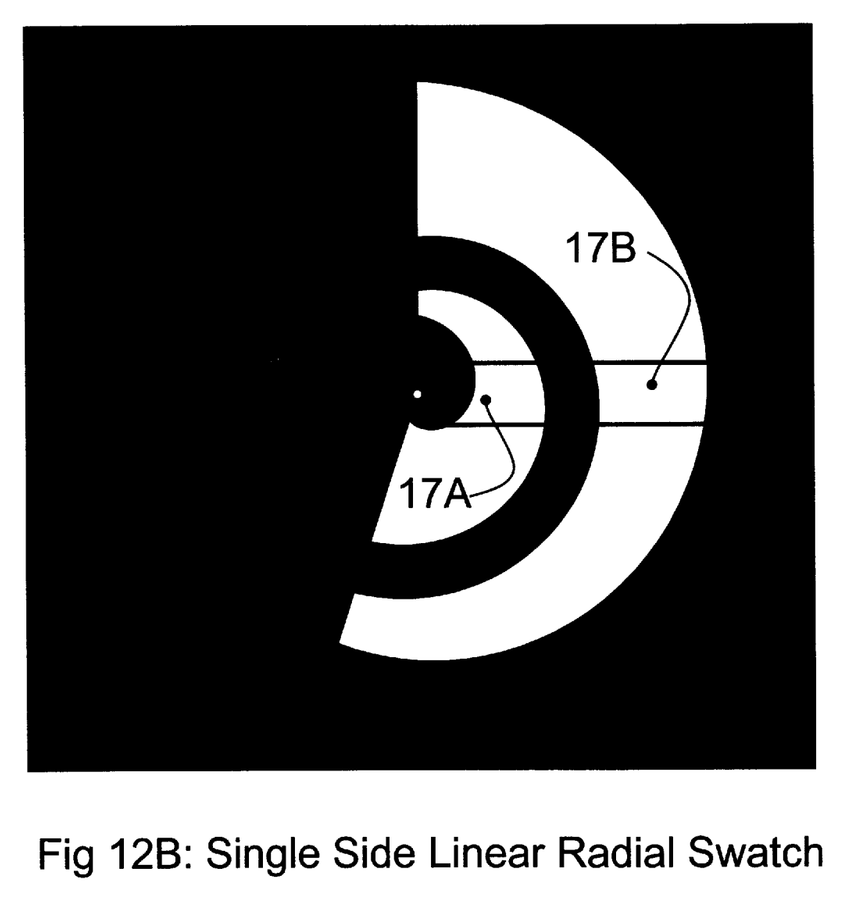

FIG. 12A is the 300+degree extension of FIG. 5A and FIG. 12B is the approximately 180 degree variant on FIG. 5A in which the crescent form has been truncated. Both patterns are sensed through fields of view 17A, 17B.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property or privilege is claimed are defined as follows:

1. A position sensor for sensing the position of a displaceable carrier surface with respect to a frame comprising:

(a) dual optical patterns that provide diffusely reflected light received from a source, said patterns being positioned on and carried by the carrier surface, (b) displacement means whereby the carrier surface and dual optical patterns are displaceable along respective geometric viewing paths, (c) dual light sensors for providing output signals carried by said frame and positioned to respectively receive diffuse light from the dual optical patterns from respective fields of view encompassing portions of each of said optical patterns as they are displaced along their respective geometric viewing paths, (d) difference measuring means coupled to receive the output signals of said dual light sensors for providing a difference output based thereon wherein the dual optical patterns are optically graded and are complementary to each other in their provision of diffuse light to said light sensors from said respective fields of view whereby said difference output corresponds to the position of the carrier surface along the geometric viewing path with respect to the frame to provide a signal wherein common mode noise is attenuated.

2. A position sensor as in claim 1 comprising a common light source means illuminating both of said dual optical patterns to provide light of correlated intensity.

3. A position sensor as in claim 2 comprising window means interposed between the respective dual light sensors and the dual optical patterns to delimit the respective fields of view of said sensors, said window means having a dimension whereby they expose only a portion of each of said optical patterns.

4. A position sensor as in claim 3 wherein said window means are provided by a mask that supports the light source and dual sensors and wherein this mask is positioned adjacent to the dual optical patterns so as to minimize access for ambient light.

5. A position sensor as in claim 4 wherein the optical patterns are in the form of portions or all of two equilateral triangles aligned to point in opposite directions with their axes of symmetry being parallel to each other.

6. A position sensor as in claim 4 the carrier wherein surface is rotatable and wherein the optical patterns comprise two crescent-shaped wedges disposed with their central, bifurcating arcs being circular and disposed about a common centre of rotation for the rotatable carrier surface.

7. A position sensor as in claim 6 wherein said crescent shaped patterns are of complementary-image shapes with center lines that are disposed at a common radial distance about the centre of rotation to provide said difference output.

8. A position sensor as in claim 6 wherein said crescent shaped patterns are nested one within the other within a sector of the rotatable carrier and are of varying widths measured radially to provide values for the output signals of the dual light sensors that are complementary in value and a provide said difference output.

9. A position sensor as in claim 1 wherein the brightness of the respective optical patterns viewed through a narrow field of view along the viewing path varies as a quadratic function of displacement.

10. A position sensor as in claim 1 wherein the brightness of the respective optical patterns viewed through a narrow field of view along the viewing path varies as a fourth polynomial function of displacement.

11. A position sensor as in claim 1 wherein said light sensors are photo-diodes that are provided with current from a voltage source through limiting resistors, said output signals being obtained from the voltage drop arising across said respective photo-diodes.

* * * * *